(12) United States Patent
Kamiya et al.

(10) Patent No.: US 7,602,790 B2
(45) Date of Patent: *Oct. 13, 2009

(54) TWO-DIMENSIONAL PIPELINED SCHEDULING TECHNIQUE

(75) Inventors: Satoshi Kamiya, Tokyo (JP); Hirokazu Ozaki, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/842,075

(22) Filed: Aug. 20, 2007

(65) Prior Publication Data

US 2008/0037550 A1 Feb. 14, 2008

Related U.S. Application Data

(63) Continuation of application No. 11/562,923, filed on Nov. 22, 2006, which is a continuation of application No. 11/255,173, filed on Oct. 21, 2005, now Pat. No. 7,161,943, which is a continuation of application No. 09/966,099, filed on Oct. 1, 2001, now Pat. No. 6,977,935.

(30) Foreign Application Priority Data

Oct. 2, 2000 (JP) ............................. 2000-302551

(51) Int. Cl.
H04L 12/56 (2006.01)
(52) U.S. Cl. .................................. 370/395.4; 370/458
(58) Field of Classification Search .............. 370/395.4, 370/458, 386–389, 395.41, 395.42, 395.43, 370/422, 423, 428, 429, 455, 459, 461, 412–418
See application file for complete search history.

(56) References Cited

U.S. PATENT DOCUMENTS 5,299,190 A * 3/1994 LaMaire et al. ............. 370/413
5,734,649 A * 3/1998 Carvey et al. ............... 370/355
6,044,061 A * 3/2000 Aybay et al. ................ 370/230

(Continued)

FOREIGN PATENT DOCUMENTS

| EP | 1103922 A2 * | 4/2002 |
|---|---|---|
| JP | 2000-174817 | 6/2000 |
| JP | 2001-7822 | 1/2001 |

OTHER PUBLICATIONS

IEEE Jun. 2000 publication by Dirceu Cavendish "CORPS—A Pipelined Fair Packet Scheduler for High Speed Switches".*
Yuval Tamir et al., "Symmetric Crossbar Arbiters for VLSI Communication Switches", IEEE Transactions on Parallel and Distributed Systems, vol. 4, No. 1, 1993, pp. 13-27.*
[Hsin-Chou Chi et al., "Starvation Prevention for Arbiters of Crossbars with Multi-Queue Input Buffers", Feb. 28, 2004, ]pp. 292-297.*
[James Hurt et al., "Design and Implementation of High-Speed Symmetric Crossbar Schedulers", Jun. 6, 1999, vol. 3, ]pp. 1478-1483.*
European Search Report dated Feb. 19, 2004.

(Continued)

*Primary Examiner*—Salmon Ahmed
(74) *Attorney, Agent, or Firm*—Harrity & Harrity, LLP

(57) ABSTRACT

A scheduler allowing high-speed scheduling scalable with the number of input and output ports of a crosspoint switch and suppressed unfairness among inputs is disclosed. The scheduler includes an M×M matrix of scheduling modules, each of which schedules packet forwarding connections from a corresponding input group of input ports to selected ones of a corresponding output group of output ports based on reservation information. A diagonal module pattern is used to determine a set of M scheduling modules to avoid coming into collision with each other. Each determined scheduling module performs reservation of packet forwarding connections based on current reservation information and transfers updated reservation information in row and column directions of the M×M matrix.

15 Claims, 14 Drawing Sheets

U.S. PATENT DOCUMENTS

| | | | |
|---|---|---|---|
| 6,618,379 B1 * | 9/2003 | Ramamurthy et al. | 370/395.41 |
| 6,661,788 B2 * | 12/2003 | Angle et al. | 370/390 |
| 6,885,639 B2 * | 4/2005 | Kamiya | 370/235 |
| 6,888,841 B1 | 5/2005 | Ozaki | |
| 6,977,935 B2 | 12/2005 | Kamiya et al. | |
| 7,058,063 B1 * | 6/2006 | Cavendish | 370/395.41 |
| 7,142,546 B2 | 11/2006 | Kamiya | |
| 7,161,943 B2 | 1/2007 | Kamiya et al. | |

OTHER PUBLICATIONS

Yuval Tamir et al., "Symmetric Crossbar Arbiters for VLSI Communication Switches", IEEE Transactions on Parallel and Distributed Systems, vol. 4, Nov. 1, 1993, pp. 13-27, XP000381322.

Hsin-Chou Chi et al., "Starvation Prevention for Arbiters of Crossbars with Multi-Queue Input Buffers", Feb. 28, 2004, pp. 292-297, XP000479405.

James Hurt et al., "Design and Implementation of High-Speed Symmetric Crossbar Schedulers", Jun. 6, 1999, vol. 3, pp. 1478-1483, XP000903619.

Dirceu Cavendish, "CORPS—A Pipelines Fair Packet Scheduler for High Speed Switches", IEEE Conference Jun. 2000, pp. 55-64.

S. Kamiyta et al., co-pending U.S. Appl. No. 11/562,923, filed Nov. 22, 2006, "Two-Dimensional Pipelined Scheduling Technique".

* cited by examiner

SCHEDULING MODULE Si

0 : NO REQUEST FOR PACKET FORWARDING
1 : REQUEST FOR PACKET FORWARDING

TWO-DIMENSIONAL PIPELINED SCHEDULING TECHNIQUE

RELATED APPLICATIONS

This application is a continuation of U.S. patent application Ser. No. 11/562,923 filed Nov. 22, 2006, which is a continuation of U.S. patent application Ser. No. 11/255,173 filed Oct. 21, 2005, now U.S. Pat. No. 7,161,943 which is a continuation of U.S. patent application Ser. No. 09/966,099 filed Oct. 1, 2001, now U.S. Pat. No. 6,977,935 which claims priority under 35 U.S.C. 119 based on Japanese Patent Application No. 2000-3025551 filed Oct. 2, 2000, all of which are incorporated by reference herein.

BACKGROUND OF THE INVENTION

1. Field of the Invention

The present invention relates to a packet switching system and in particular to a pipelined scheduling method and scheduler implemented in the packet switching system.

2. Description of the Prior Art

With an explosion in the use of the Internet, there is a growing demand for using the Internet as an infrastructure of communications. In order that the Internet acts as such a communication infrastructure, it is necessary for a router as a server node to enhance the speed of data transfer and its function. Existing high-speed routers employ IP address searching achieved with hardware and high-speed data transfer processing with a self-routing high-speed switch fabric.

To meet such a growing demand for high-speed switching, there has been widely used a Virtual Output Queuing (VOQ) crosspoint switch having N input ports and N output ports, where each input port has N logical queues each corresponding to the N output ports. There have been proposed scheduling methods for such a crosspoint switch.

A two-dimensional round-robin scheduling mechanism has been disclosed in U.S. Pat. No. 5,299,190. This mechanism uses a request matrix with each row representing an input and each column representing an output. A bit in a given row and column of the matrix thus represents a request from a corresponding input port for connection to a corresponding output port. Diagonal service patterns are used to overlay the request matrix to determine which requests are to be serviced. A sequence of diagonal service patterns for each of K time slots is used to provide guaranteed service with fairness.

A similar scheduling method in a data packet router has been disclosed in U.S. Pat. No. 5,734,649. In the data packet router, a matrix of crosspoint switch elements connects data sources to selected destinations during each of a succession of intervals. Allocation of switch elements to desired connections is accomplished by a process which provides a data array having a number of data elements corresponding to the number of switch elements. During each interval, a source is assigned to each of the data elements in accordance with a first current pseudo-random shuffle pattern and a respective destination is assigned to each of the data elements in accordance with a second current pseudo-random shuffle pattern. A new set of shuffle patterns is generated during each interval. A testing of successively progressing diagonal grouping of regions across the array of the sources and destinations is performed to search for a match not previously allocated and each match is allocated to the switch element corresponding to the respective data element.

However, these conventional scheduling methods have a disadvantage such that the volume of data processing for each time slot goes up with the square of the number of ports. Accordingly, it becomes difficult to enhance the speed of scheduling as the number of input/output ports increases.

As a promising scheduling protocol to overcome the above disadvantage, a round-robin greedy scheduling (RRGS) algorithm has been proposed by the present Applicant in Japanese Patent Application No. 11-172584 (Unexamined Publication No. P2000-174817). The RRGS algorithm can be implemented in an N×N packet switch, wherein N scheduling modules $S_1$-$S_N$ are provided for N inputs, respectively. Each of the scheduling modules $S_1$-$S_N$ performs scheduling for a predetermined future time slot, and transfers reserved output port information to the adjacent scheduling module. In this way, output port reservation at the predetermined future time slot can be completed during N time slots prior to the predetermined future time slot. Such scheduling is performed at each time slot by pipeline processing to achieve N×N scheduling for future time slots, resulting in high-speed packet forwarding.

A framed RRGS algorithm has been proposed by the present Applicant in Japanese Patent Application No. 2000-55103 (Unexamined Publication No. 2001-7822). In the framed RRGS, a sequence of frames is set, each of which consists of a plurality of time slots. Input packets are scheduled in a current frame so that they are forwarded to appropriate ones of the output ports in a next frame following the current frame. More specifically, the scheduling in each frame is performed by simultaneously starting scheduling decision processes of the N input port scheduling modules at the beginning of the frame, simultaneously performing the scheduling decision processes using a pipelined approach in the frame, and simultaneously completing the scheduling decision processes at the end of the frame.

Although the above-described RRGS and framed RRGS algorithms can provide high-speed and high-efficient data forwarding, the amount of output-port arbitration processing increases as the number of input and output ports increases.

SUMMARY OF THE INVENTION

An object of the present invention is to provide a pipelined scheduling method and scheduler allowing high-speed scheduling scalable with The number of input and output ports.

Another object of the present invention is to provide a pipelined scheduling method and scheduler allowing high-speed scheduling and suppressed unfairness among inputs.

According to an aspect of the present invention, a scheduler for scheduling packet forwarding connections from N input ports to selected ones of N output ports at each time slot in a crosspoint switch, wherein N is a positive integer, includes: an M×M matrix of scheduling modules, each of which schedules packet forwarding connections from a corresponding input group of input ports to selected ones of a corresponding output group of output ports based on reservation information of combinations of corresponding input and output ports at each time slot, wherein the N input ports are equally divided into M input groups and the N output ports are equally divided into M output groups; and a selector for selecting a sequential one of different module patterns covering the M×M matrix of scheduling modules, wherein each of the different module patterns determines a set of M scheduling modules to avoid coming into collision with each other and determines a sequence of transferring reservation information, wherein a scheduling module determined by a selected module patter performs reservation of packet forwarding connections based on current reservation information of combinations of corresponding input and output ports and transfers updated reservation information according to the sequence determined by the selected module pattern.

According to anther aspect of the present invention, a pipelined scheduling method for an N×N crosspoint switch for connecting N input ports to selected ones of N output ports at each time slot, includes the steps of: a) storing N logical queues for each of the N input ports, corresponding to respective ones of the N output ports, wherein the N input ports are equally divided into M input groups and the N output ports are equally divided into M output groups; b) storing packet forwarding requests in an M×M matrix of modules, each of which stores packet forwarding requests from a corresponding input group of input ports to selected ones of a corresponding output group of output ports; c) selecting M module patterns covering the M×M matrix of modules, wherein each of the module patterns determines a different set of M modules to avoid coming into collision with each other; and d) performing the following steps d.1) through d.3) in each of the M modules determined by each of the selected M module patterns at each time slot to perform pipelined scheduling: d.1) reserving combinations of corresponding input and output ports at a predetermined future time slot depending on the corresponding packet forwarding requests based on input port reservation information and output port reservation information, which are received from two previous-stage modules in row and column directions of the M×M matrix; d.2) updating the input port reservation information and the output port reservation information depending on which combinations are reserved; and d. 3) transferring updated input port reservation information and updated output port reservation information to two subsequent-stage modules in row and column directions of the M×M matrix.

The step d) may be concurrently performed in M scheduling processes for different future time slots, wherein each of the M scheduling processes starts with a different one of the selected M module patterns. Each of the selected M module patterns may be a diagonal service pattern in a predetermined diagonal module group.

According to the present invention, a method for scheduling packet forwarding connections providing combinations of N input ports and N output ports of a crosspoint switch, includes the steps of: grouping possible combinations of the N input ports and the N output ports into M×M groups, wherein the N input ports are equally divided into M groups and the N output ports are equally divided into M groups; allocating a packet forwarding request from an input port to a desired output port to a corresponding one of the M×M groups; sequentially selecting a predetermined set of M diagonal service patterns in the M×M groups; and scheduling packet forwarding connections in pipelines according to a sequentially selected diagonal service pattern.

As described above, different module patterns covering the M×M matrix of scheduling modules are prepared to avoid coming into collision with each other. Accordingly, it is possible for the M×M matrix of scheduling modules to perform pipelined scheduling in both row and column directions of the matrix, resulting in enhanced efficiency of packet forwarding and therefore high-speed scheduling. Further, since the input and output ports are divided into M×M groups, the high-speed scheduling scalable with the number of input and output ports can be achieved.

M scheduling processes for different future time slots can be concurrently performed in pipelines and each of the M scheduling processes starts with a different one of the selected M module patterns. Accordingly, an equal chance of reservation is given to the M×M matrix of scheduling modules.

DETAILED DESCRIPTION OF THE PREFERRED EMBODIMENTS

Switching System

Figure 1:
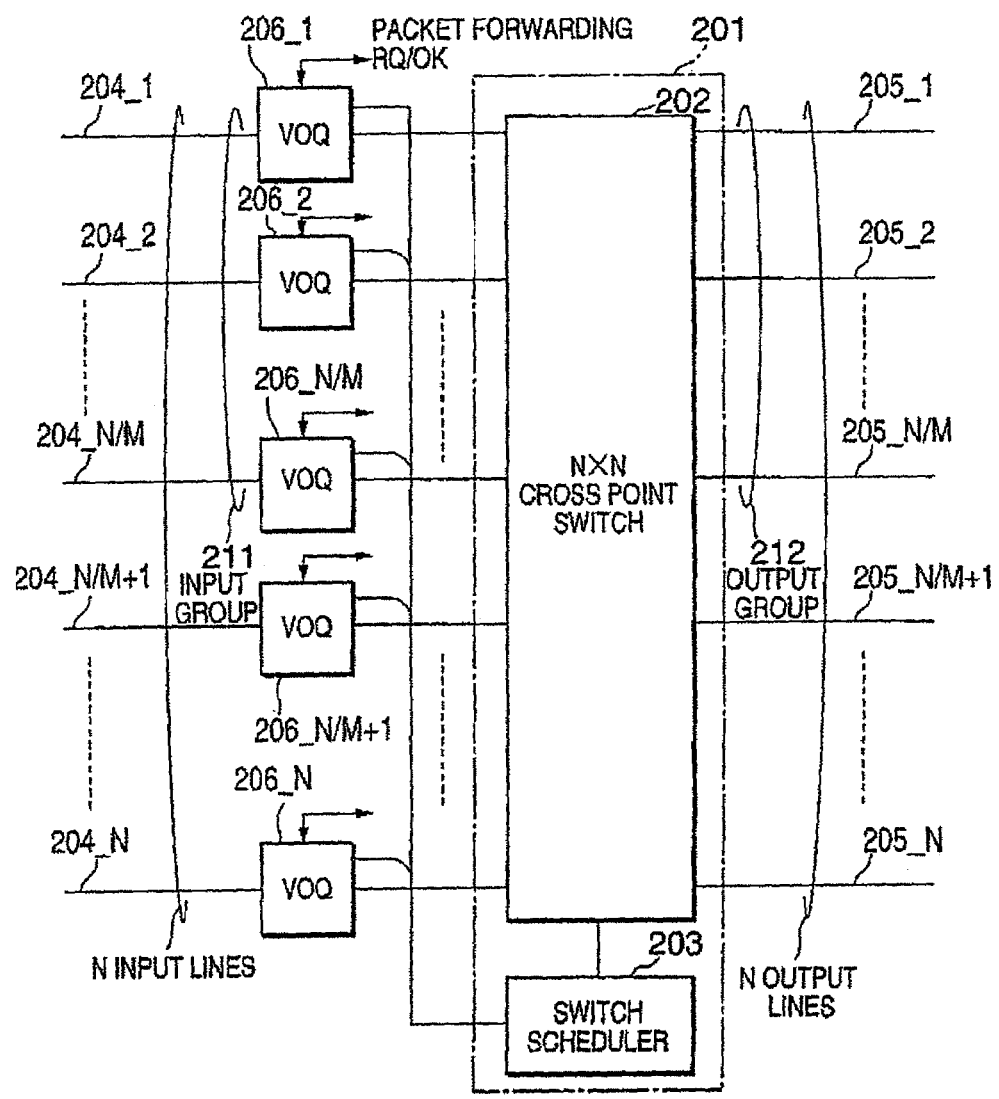
FIG. 1 is a block diagram showing a packet switching system employing a switch scheduler according to the present invention.

Referring to FIG. 1, a packet switching system according to an embodiment of the present invention is provided with a switch section 201 including an N×N crosspoint switch 202 and a switch scheduler 203. The crosspoint switch 202 has N input ports corresponding to respective ones of N input lines 204_1 to 204_N and N output ports corresponding to respective ones of N output lines 205_1 to 205_N, where N is an integer greater than 1. The respective N input ports of the crosspoint switch 202 are connected to the N input lines 204_1 to 204_N through N input interfaces each including N VOQs (virtual output queues) 206_1 to 206_N. Each of the N input interfaces includes not only a VOQ but also a destination resolution engine and a packet assembly/disassembly section (PAD), which are not shown in FIG. 1. Here, the crosspoint switch 202 performs switching of fixed-length packets (cells). The PAD assembles packets from cells received from the crosspoint switch 202 and disassembles packets received from a corresponding input line into cells to be forwarded to the crosspoint switch 202.

From a viewpoint of function, the N input lines 204_1 to 204_N are equally divided into M input groups (IGs) 211, where M is a submultiple of N. Accordingly, each input group 211 accommodates N/M input lines and corresponding VOQs. Similarly, the N output lines 205_1 to 205_N are equally divided into M output groups (OGs) 212. Accordingly, each output group 212 accommodates N/M output lines. Each of the VOQs 206_1 to 206_N sends a packet forwarding request (RQ) to the switch scheduler 203 and receives packet forwarding permission (OK) from the switch scheduler 203.

Figure 2:
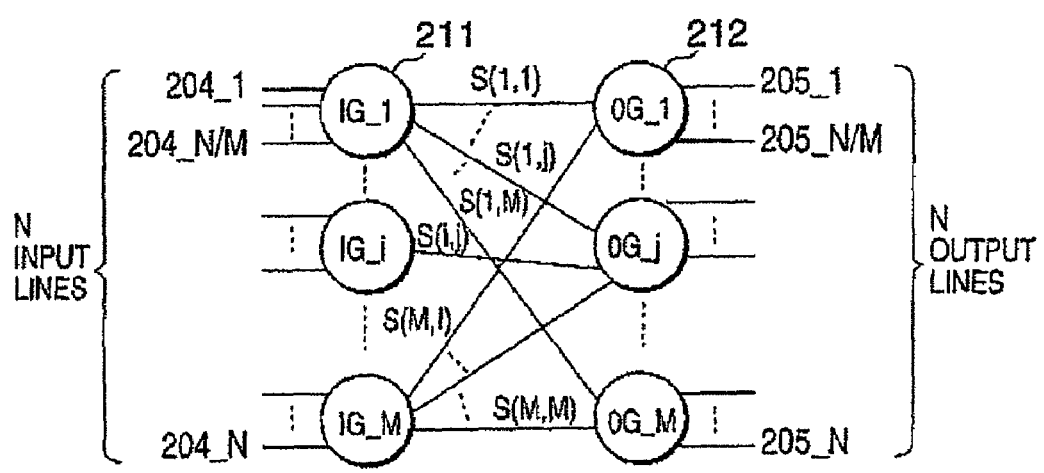
FIG. 2 is a diagram showing a correspondence relationship between grouped input lines and grouped output lines.

Referring to FIG. 2, as described above, the N input lines 204_1 to 204_N are equally divided into M input groups IG_1 to IG_M and the N output lines 205_1 to 205_N are equally divided into M output groups OG_1 to OG_M. Accordingly, there are M×M different combinations of M input groups and M output groups. In this embodiment, M×M scheduling modules S(1,1) to S(M,M) are provided corresponding to respective ones of the M×M different combinations.

Figure 4:
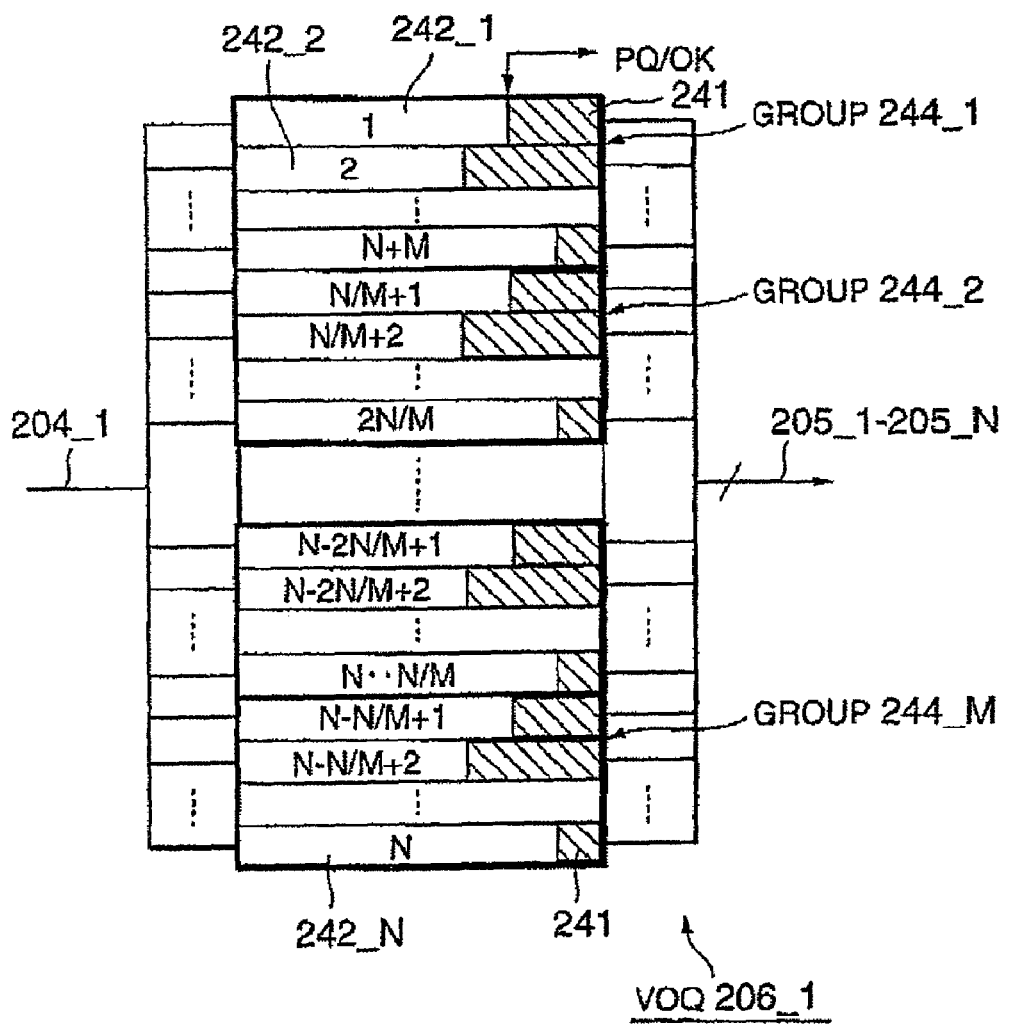
FIG. 4 is a schematic diagram showing a packet storing status of a VOQ in the embodiment.

The VOQs 206_1 to 206_N have the same structure. As shown in FIG. 4, taking the VOQ 206_1 corresponding to the input line 204_1 as an example, the VOQ 206_1 stores N logical queues (buffer memories) 242_1 to 242_N each corresponding to the N output lines 205_1 to 205_N. From a viewpoint of function, the N logical queues 242_1 to 242_N are equally divided into M groups 244_1 to 244_M, which correspond to the M output groups OG_1 to OG_M, respectively. When a fixed-length packet arrives at the VOQ 206_1 through the input interface of the input line 204_1, the input packet is sent to one of the N logical queues 242_1 to 242_N depending on the destination address of the input packet and stored therein. The number of stored packets would be different from queue to queue as shown by the diagonally shaded area in FIG. 4.

Switch Scheduler

Figure 3:
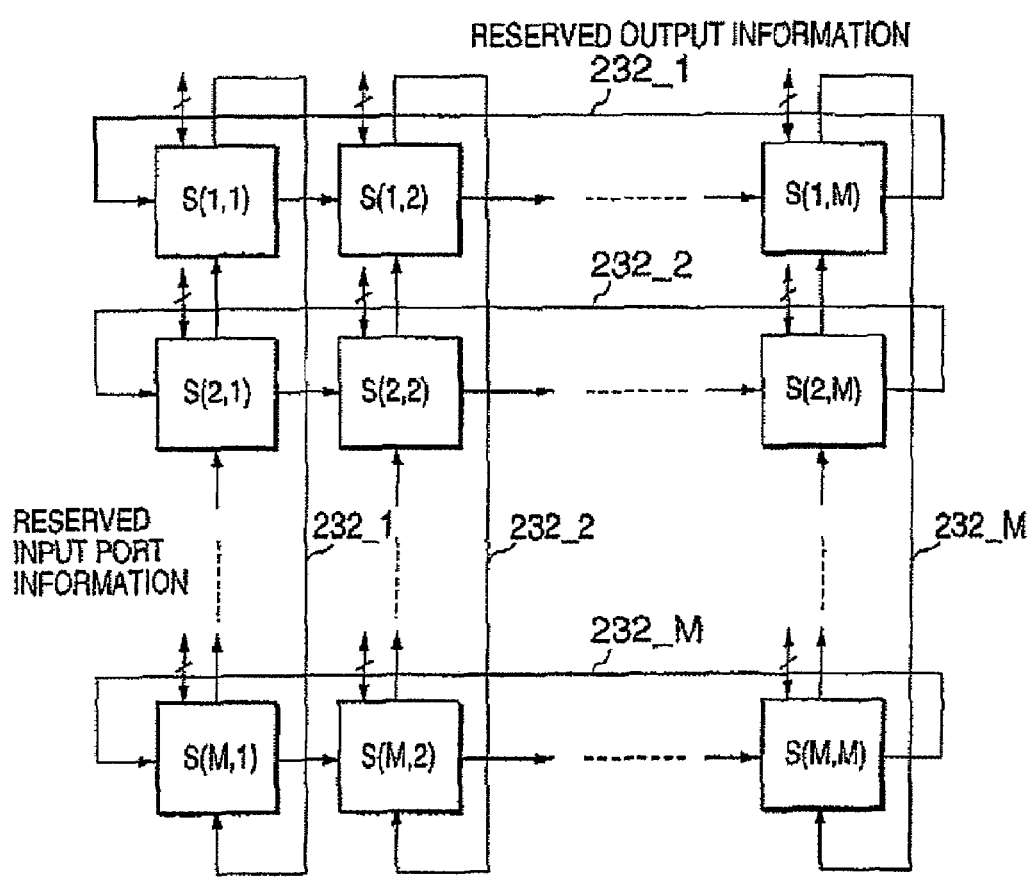
FIG. 3 is a block diagram showing a switch scheduler according to an embodiment of the present invention.

As shown in FIG. 3, the switch scheduler 203 prepares the M×M scheduling modules S(1,1) to S(M,M) corresponding to respective ones of the M×M different combinations. Here, a scheduling module S(i,j) corresponds to a combination of i-th input group IG_i and j-th output group OG_j, where i=1, 2, ..., or M and j=1, 2, ..., or M. Since the input group IG_i and the output group OG_j accommodate respectively N/M input lines and N/M output lines, the scheduling module S(i,j) performs N/M×N/M different schedules for a given future time slot based on packet forwarding requests issued from the corresponding N/M VOQs. When completing the scheduling, the scheduling module S(i,j) transfers reserved input port information 231_j, or input port reservation status, updated by the scheduling module S(i,j) to an adjacent scheduling module S(i−1,j), where if i−1=0, then it is replaced with M. At the same time, the scheduling module S(i,j) transfers reserved output port information 232_i, or output port reservation status, updated by the scheduling module S(i,j) to an adjacent scheduling module S(i,j+1), where if j+1=M+1, then it is replaced with 1.

In this embodiment, a packet to be forwarded has a fixed length and one time slot is defined as a time period required for forwarding a packet from one input port to one output port. When receiving the reserved input and output port information 231_j and 232_i from the previous scheduling modules S(i+1,j) and S(i,j−1), the scheduling module S(i,j) makes a two-dimensional reservation of input and output ports based on the packet forwarding requests from corresponding VOQs and the reserved input and output port information 231_j and 232_i so as to avoid coming into collision with other scheduling modules.

In FIG. 3, the reserved input port information 231_j sequentially visits a column of scheduling modules S(1,j) to S(M,j) in round robin fashion and the reserved output port information 232_i sequentially visits a row of scheduling modules S(i,1)-S(i,M) in round robin fashion. In other words, the scheduling modules S(1,1)-S(M,M) are connected in row and column directions so as to make a round of reservation information. However, such a scheduling module connection sequence is not limited to as shown in FIG. 3. The scheduling module connection sequence may be determined depending on which one of different diagonal module groups is selected (see FIGS. 9-14).

Two-Dimensional Pipelined Scheduling

Figure 5A:
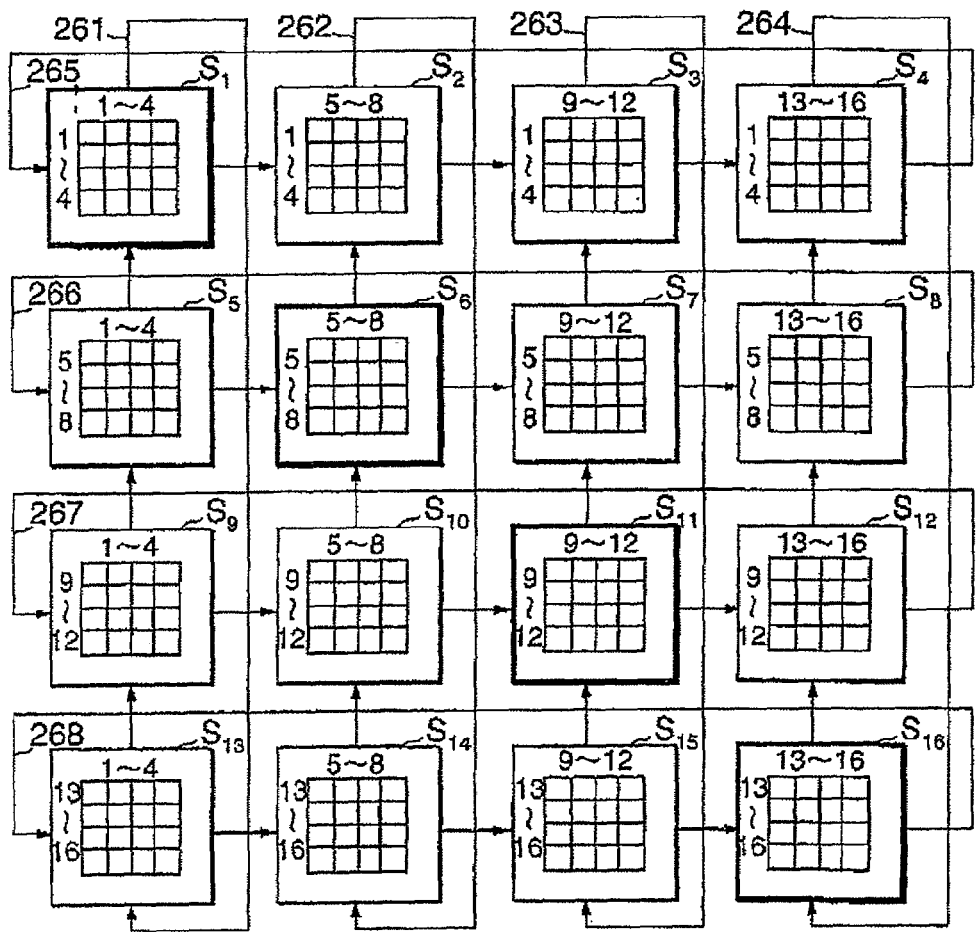
FIG. 5A is a block diagram showing an example of the switch scheduler for explanation of a two-dimensional pipelined scheduling method according to the embodiment of the present invention.
Figure 5B:
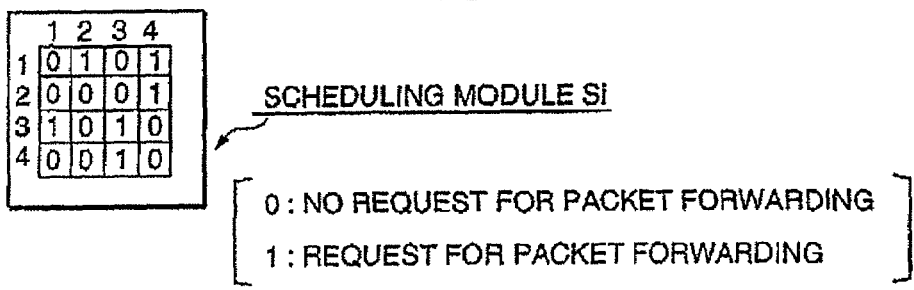
FIG. 5B is a diagram showing an example of a matrix stored in one scheduling module of the switch scheduler as shown in FIG. 5A.

As shown in FIG. 5A, a matrix of scheduling modules $S_1$-$S_{16}$ is provided in the switch scheduler, for simplicity, when N=16 and M=4 in FIG. 3. In this case, the switch section 20l has a 16×16 crosspoint switch 202 having 16 input ports and 16 output ports. The 16 input lines are equally divided into 4 input groups and the 16 output lines are equally divided into 4 output groups. Accordingly there are 16 different combinations of 4 input groups and 4 output groups, the different combinations corresponding to respective ones of the scheduling modules $S_1$-$S_{16}$.

Referring to FIG. 55, a scheduling module $S_i$ (i=1,2, ... or 16) stores a 4×4 matrix of corresponding input ports (indicated by numerals 1-4 in vertical direction on the left side of the matrix) and output ports (indicated by numerals 1-4 in horizontal direction on the top of the matrix). More specifically each component of the 4×4 matrix uses a logical value "1" or "0" to indicate the presence or absence of a packet forwarding request from a corresponding input port to a corresponding output port, Taking the scheduling module $S_1$ as an example, since the (1,1) component is "0", there is received no packet forwarding request from the input port 204_1 to the output port 205_1. Since the (1,2) component is "1", there is received a packet forwarding request from the input port 204_1 to the output port 205_2.

In FIG. 5A, the scheduling module $S_1$ stores the 4×4 matrix of input ports 204_1 to 204_4 (indicated by port numbers 1-4 in vertical direction on the left side of the matrix) and output ports 205_1 to 205_4 (indicated by port numbers 1-4 in horizontal direction on the Lop of the matrix). Similarly, the scheduling module $S_2$ stores the 4×4 matrix of input ports 204_1 to 204_4 (indicated by port numbers 1-4 in vertical direction on the left side of the matrix) and output ports 205_5 to 205_8 (indicated by port numbers 5-8 in horizontal direction on the top of the matrix). The same goes for the following scheduling modules $S_3$-$S_{16}$.

For example, when a packet has been received at the input port 204_2 to be forwarded to the output port 205_3, the corresponding VOQ 206_2 sends a packet forwarding request for the output port 205_3 to the switch scheduler 203. In this case, the packet forwarding request enters the scheduling module $S_1$ and thereby the (2,3) component of the matrix changes from "0" to "1". Similarly, when a packet has been received at the input port 204_7 to be forwarded to the output port 205_11, the corresponding VOQ 206_7 sends a packet forwarding request for the output port 205_11 to the switch scheduler 203. In this case, the packet forwarding request enters the scheduling module $S_7$ and thereby the (3,3) component of the matrix changes from "0" to "1".

As shown in FIG. 5A, in this example, the four scheduling modules $S_1$, $S_6$, $S_{11}$, and $S_{16}$, provide a diagonal service pattern in a selected diagonal module group. It is apparent from FIG. 5A that the four scheduling modules $S_1$, $S_6$, $S_{11}$, and $S_{16}$, are combined to avoid coming into collision with other scheduling modules. For example, the input ports 204_1 to 204_4 of the scheduling modules $S_1$ do not come into collision with other input ports 204_5 to 204_16 of the other scheduling modules $S_6$, $S_{11}$, and $S_{16}$. Similarly, the output ports 205_1 to 205_4 of the scheduling modules $S_1$ do not come into collision with other input ports 205_5 to 205_16 of the other scheduling modules $S_6$, $S_{11}$, and $S_{16}$.

There are further three diagonal service patterns in the selected diagonal module group: ($S_2$, $S_7$, $S_{12}$, $S_{13}$); ($S_3$, $S_8$, $S_9$, $S_{14}$); and ($S_4$, $S_5$, $S_{10}$, $S_{15}$). These four diagonal service patterns concurrently perform respective scheduling processes for different future time slots in the same time slot, resulting in enhanced efficiency of scheduling.

When each scheduling module completes its scheduling processes in a time slot, the scheduling module transfers the reserved input port information to an adjacent scheduling module in the horizontal arrow direction of FIG. 5A. At the same time, the scheduling module transfers the reserved output port information to an adjacent scheduling module in the vertical arrow direction of FIG. 5A. For example, the scheduling module $S_1$ updates the reserved input port information 265 and transfers the updated one 265 to the adjacent scheduling module $S_2$. At the same time, the scheduling module $S_1$ updates the reserved output port information 261 and transfers the updated one 261 to the adjacent scheduling module $S_1$. Each scheduling module performs 4×4 scheduling processes for predetermined future time slots based on packet forwarding requests received from corresponding VOQs and the reserved input and output port information received from the previous scheduling modules. The reserved input and output port information are updated by the scheduling module and then are transferred to the next scheduling modules.

In this manner, the reserved input and output port information make a round of the scheduling module $S_1$ to $S_{16}$ for 4 time slots while the scheduling modules performing the respective scheduling processes, thereby obtaining the scheduling for a predetermined future time slot.

There are needed two requirements to execute the above-described scheduling processes. First, the 4×4 scheduling processes of a scheduling module including the transfer processes of the reserved input and output port information must be completed for one time slot. Second, an equal chance of reservation must be given to the four input VOQs for each group. In other words, if the one-time-slot completion and fairness requirements are satisfied, any scheduling algorithm may be employed. For example, the scheduling algorithms disclosed in U.S. Pat. Nos. 5,299,190 and 5,734,649 may be used.

Figure 6:
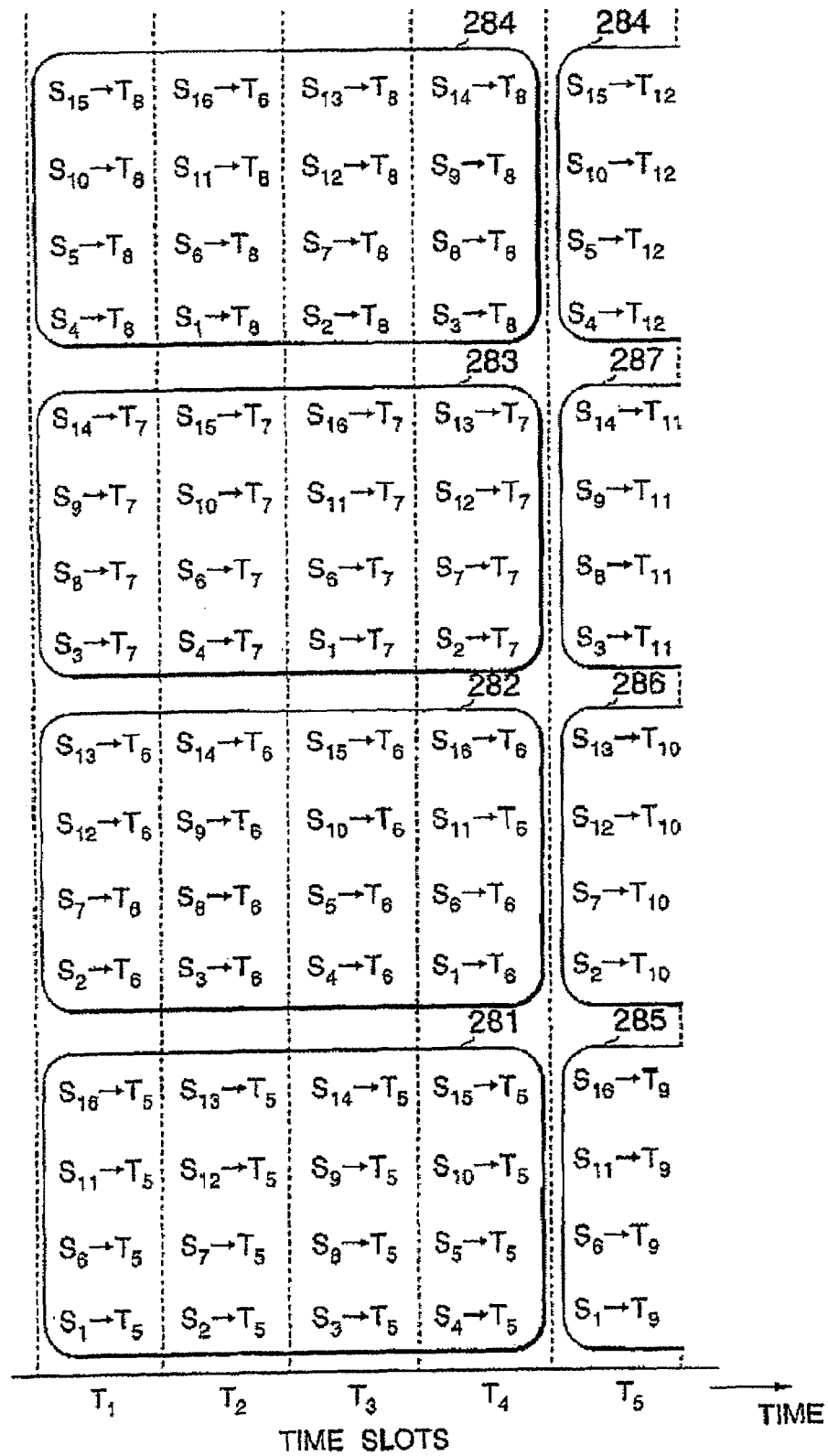
FIG. 6 is a time chart showing a first frame of time slots in a two-dimensional pipelined scheduling performed in the switch scheduler as shown in FIG. 5A.

Referring to FIG. 6, in this example, the scheduling modules $S_1$, $S_6$, $S_{11}$, and $S_{16}$ which provide a diagonal service pattern in the selected diagonal module group has the right to first start reservation of input and output combinations for the future time slot $T_5$ at the time slot $T_1$.

When there occur packet forwarding requests from the input ports 204_1 to 204_4 to the output ports 205_1 to 205_4 and some of them come into collision, the scheduling module $S_1$ arbitrates the packet forwarding requests. For example, if all VOQs 206_1 to 206_4 request the same output port 205_1, then the scheduling module $S_1$ arbitrates these requests to respond to only one request. Similarly, when there occur packet forwarding requests from the input ports 204_5 to 204_8 to the output ports 205_5 to 205_8 and some of them come into collision, the scheduling module $S_6$ arbitrates those packet forwarding requests. When there occur packet forwarding requests from the input ports 204_9 to 204_12 to the output ports 205_9 to 205_12 and some of them come into collision, the Scheduling module $S_{11}$ arbitrates these packet forwarding requests. When there occur packet forwarding requests from the input ports 204_13 to 204_16 to the output ports 205_13 to 205_16 and some of them come into collision, the scheduling module $S_{16}$ arbitrates these packet forwarding requests. In this manner, the scheduling modules $S_1$, $S_6$, $S_{11}$, and $S_{16}$ perform the scheduling of a scheduling process group 281 at the time slot $T_1$.

After having completed the scheduling, the scheduling modules $S_1$, $S_6$, $S_{11}$, and $S_{16}$ perform updating and transferring of reservation status information. More specifically, the scheduling module $S_1$ updates the reserved input port information 265 and the reserved output port information 261 and then transfers the updated ones 265 and 261 to the adjacent scheduling module $S_2$ and the adjacent scheduling module $S_{13}$, respectively. The scheduling module $S_6$ updates the reserved input port information 266 and the reserved output port information 262 and then transfers the updated ones 266 and 262 to the adjacent scheduling module $S_7$ and the adjacent scheduling module $S_2$, respectively. The scheduling module $S_{11}$ updates the reserved input port information 267 and the reserved output port information 263 and then transfers the updated ones 267 and 263 to the adjacent scheduling module $S_{13}$ and the adjacent scheduling module $S_7$, respectively. The scheduling module $S_{16}$ updates the reserved input port information 268 and the reserved output port information 264 and then transfers the updated ones 268 and 264 to the adjacent scheduling module $S_{13}$ and the adjacent scheduling module $S_{12}$, respectively.

At the next time slot $T_2$, the scheduling modules $S_2$, $S_7$, $S_{12}$, and $S_{13}$ perform the next-stage scheduling of the scheduling process group 281 for the future time slot $T_5$ based on the received packet forwarding requests and the reserved input and output port information received from the previous scheduling modules $S_1$, $S_6$, $S_{11}$, and $S_{16}$, respectively. As described before, a previously reserved combination of input and output ports cannot be reserved in the present scheduling stage of the time slot $T_2$. After having completed the scheduling, the scheduling modules $S_2$, $S_7$, $S_{12}$, and $S_{13}$ perform updating of reservation status information and transferring thereof as described before.

At the next time slot $T_3$, the scheduling modules $S_3$, $S_8$, $S_9$, and $S_{14}$, perform the next-stage scheduling of the scheduling process group 281 for the future time slot $T_5$, based on the received packet forwarding requests and the reserved input and output port information received from the previous scheduling modules $S_2$, $S_7$, $S_{12}$, and $S_{13}$, respectively. After having completed the scheduling, the scheduling modules $S_3$, $S_R$, $S_9$, and $S_{14}$ perform updating of reservation status information and transferring thereof as described before.

At the next time slot $T_4$, the scheduling modules $S_4$, $S_5$, $S_{10}$, and $S_{15}$ perform the next-stage scheduling of the scheduling process group 281 for the future time slot $T_5$ based on the received packet forwarding requests and the reserved input and output port information received from the previous scheduling modules $S_3$, $S_8$, $S_9$, and $S_{12}$, respectively.

In this manner, the scheduling process group 281 for the future time slot $T_5$ is completed for the time period of four time slots $T_1$ to $T_4$. In other words, the reservation from the input ports 204_1 to 204_16 to appropriate ones of the output ports 205_1 to 205_16 for the future time slot $T_5$ is completed.

As described above, however, one diagonal service pattern such as a set of the scheduling modules $S_1$, $S_6$, $S_{11}$, and $S_{16}$ performs the scheduling for only one time slot during the scheduling process group 281. Accordingly, further three scheduling process groups 282-284 for different future time slots can be operated in parallel to the scheduling process group 281 as shown in FIG. 6. In addition, to ensure fairness among the scheduling modules $S_1$ to $S_{16}$, four diagonal service patterns may be employed to start each of the scheduling process groups 281-284 with a different diagonal module group. The details will be described hereinafter.

As shown in FIG. 6, the scheduling modules $S_2$, $S_7$, $S_{12}$, and $S_{13}$ which provide another diagonal service pattern in the selected diagonal module group perform the scheduling of a scheduling process group 282 for the future time slot $T_6$ at the time slot $T_1$. After having completed the scheduling, the scheduling modules $S_2$, $S_7$, $S_{12}$, and $S_{13}$ perform updating and transferring of reservation status information.

At the next time slot $T_2$, the scheduling modules $S_3$, $S_6$, $S_9$, and $S_{14}$ perform the next-stage scheduling of the scheduling process group 282 for the future time slot $T_6$ based on the received packet forwarding requests and the reserved input and output port information received from the previous scheduling modules $S_2$, $S_7$, $S_{12}$, and $S_{13}$, respectively. After having completed the scheduling, the scheduling modules $S_3$, $S_8$, $S_9$, and $S_{14}$ perform updating of reservation status information and transferring thereof as described before.

At the next time slot $T_3$, the scheduling modules $S_4$, $S_5$, $S_{10}$, and $S_{15}$, perform the next-stage scheduling of the scheduling process group 282 for the future time slot $T_6$ based on the received packet forwarding requests and the reserved input and output port information received from the previous scheduling modules $S_3$, $S_8$, $S_9$, and $S_{14}$, respectively. After having completed the scheduling, the scheduling modules $S_4$, $S_5$, $S_{10}$, and $S_{15}$ perform updating of reservation status information and transferring thereof as described before.

At the next time slot $T_4$, the scheduling modules $S_1$, $S_6$ $S_{11}$, and $S_{16}$ perform the next-stage scheduling of the scheduling process group 282 for the future time slot $T_6$ based on the received packet forwarding requests and the reserved input and output port information received from the previous scheduling modules $S_4$, $S_5$, $S_{10}$, and $S_{15}$, respectively.

In this manner, the scheduling process group 282 for the future time slot $T_6$ is completed for the time period of four time slots $T_1$ to $T_4$ in parallel to the above scheduling process group 281. Similarly, the respective scheduling process groups 283 and 284 for the future time slots $T_7$ and $T_8$ are completed for the time period of four time slots $T_1$ to $T_4$ in parallel to the above scheduling process groups 281 and 282.

Figure 7:
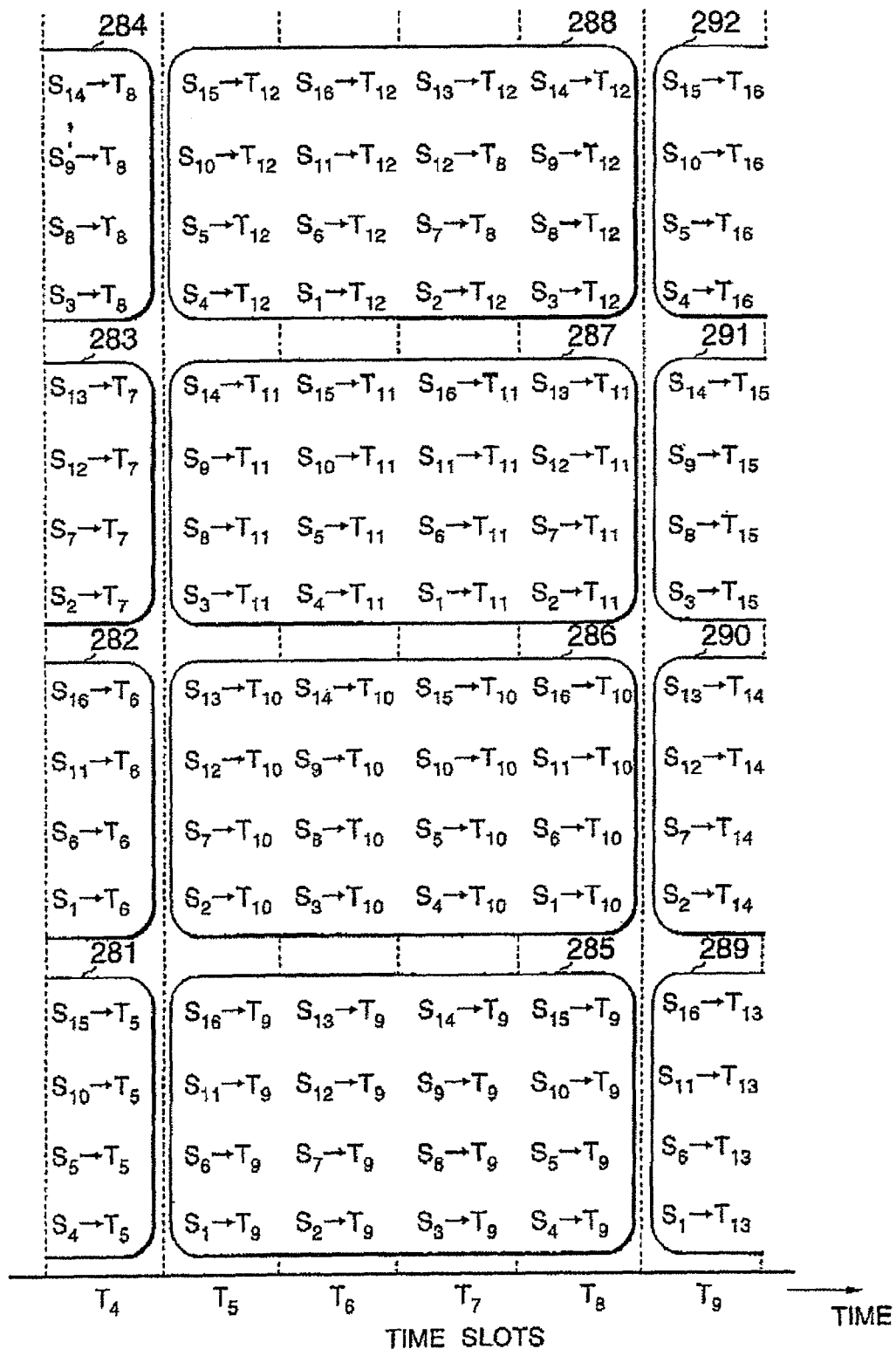
FIG. 7 is a time chart showing a second frame of time slots in a two-dimensional pipelined scheduling performed in the switch scheduler as shown in FIG. 5A.
Figure 8:
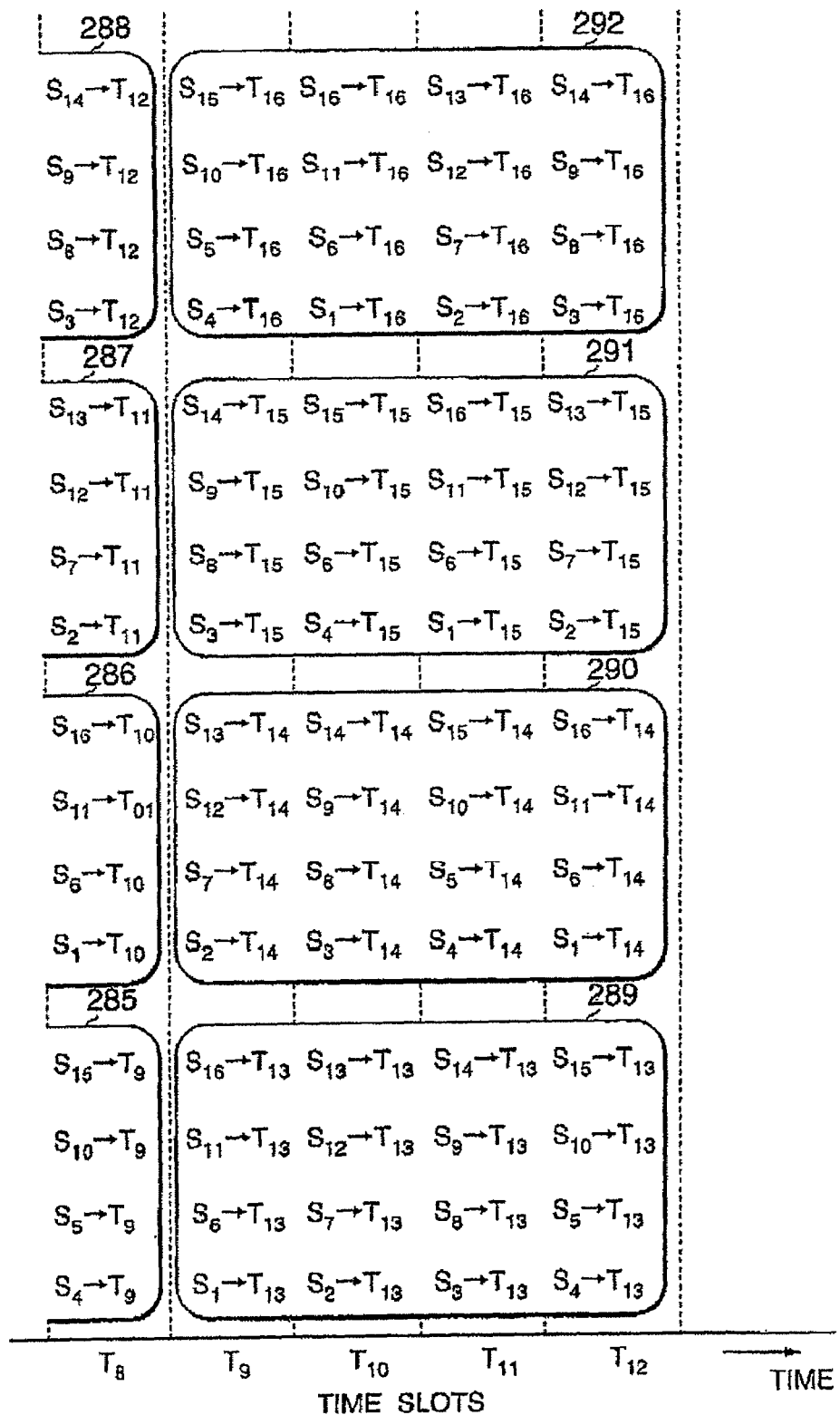
FIG. 8 is a time chart showing a third frame of time slots in a two-dimensional pipelined scheduling performed in the switch scheduler as shown in FIG. 5A.

As shown in FIGS. 7 and 8, the same operation goes for the scheduling process groups 285-289. Since each of the scheduling process groups operating in parallel starts with a different diagonal service pattern, an equal chance of reservation is given to the scheduling modules $S_1$ to $S_{16}$.

Diagonal Module Groups

In FIGS. 9-14, various diagonal module groups each having different module connection sequences are shown. A diagonal service pattern is formed by four shaded circles in each 4×4 matrix, which represents an array of scheduling modules $S_1$-$S_{16}$ as shown in FIG. 5A. A diagonal module group is composed of four diagonal service patterns connected in serial by three horizontal arrows.

In FIGS. 9-14, a parenthesized set of four numerals each separated by a comma on the top of the matrix shown at the top left in each of FIGS. 9-14 indicate a sequence of transfer of reserved input port information, which is commonly used in each matrix of FIGS. 9-14, Four numerals vertically arranged on the left side of the leftmost matrix in each diagonal module group indicate a sequence of transfer of reserved input port information. A parenthesized numeral on the bottom of each matrix indicates a serial number of diagonal service patterns. In FIGS. 9-14, the same serial number indicates the same diagonal service pattern.

Figure 9:
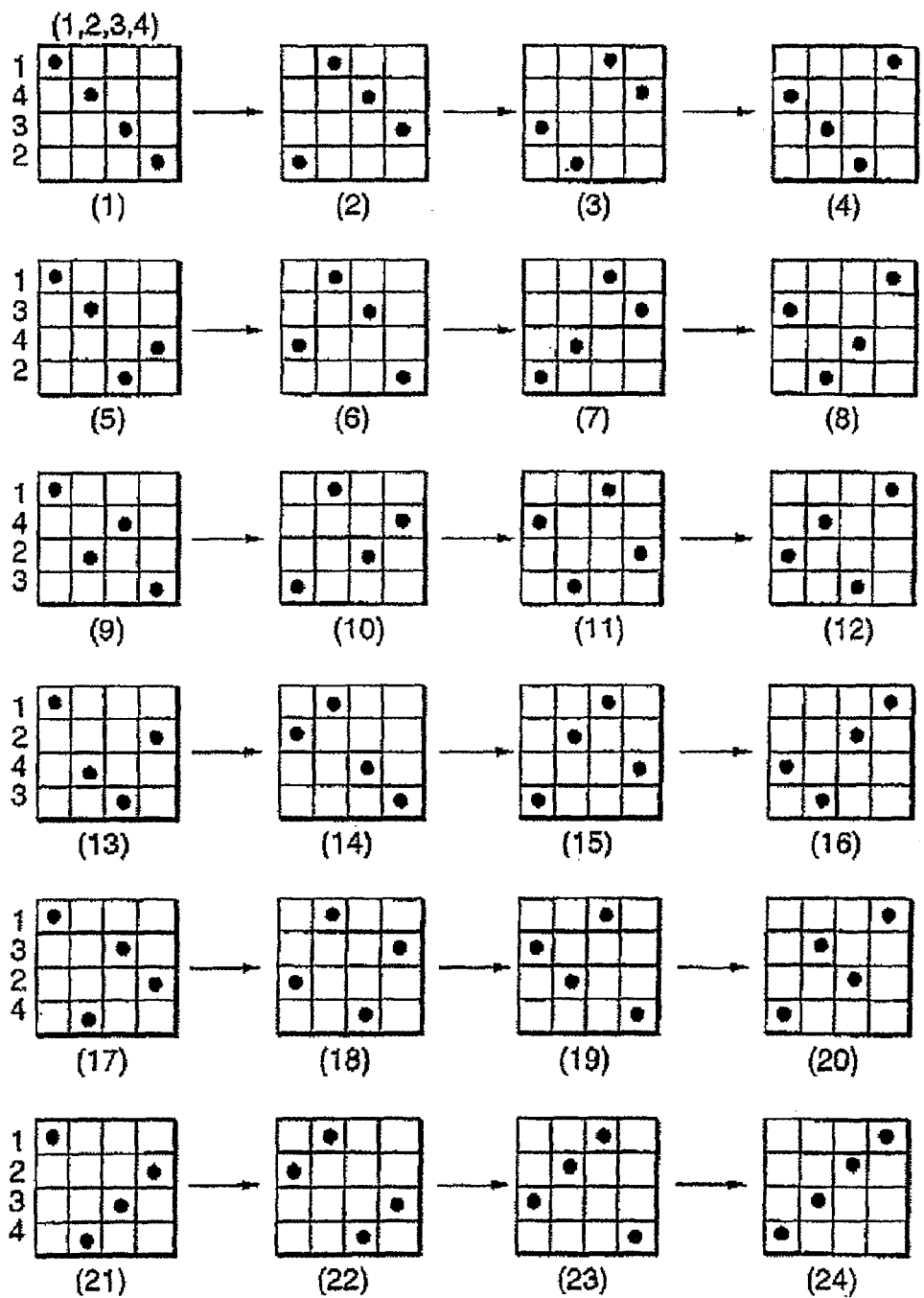
FIG. 9 is a diagram showing a first example of selected sets of diagonal modules and connection sequences of the diagonal modules in the two-dimensional pipelined scheduling performed in the switch scheduler as shown in FIG. 5A.
Figure 10:
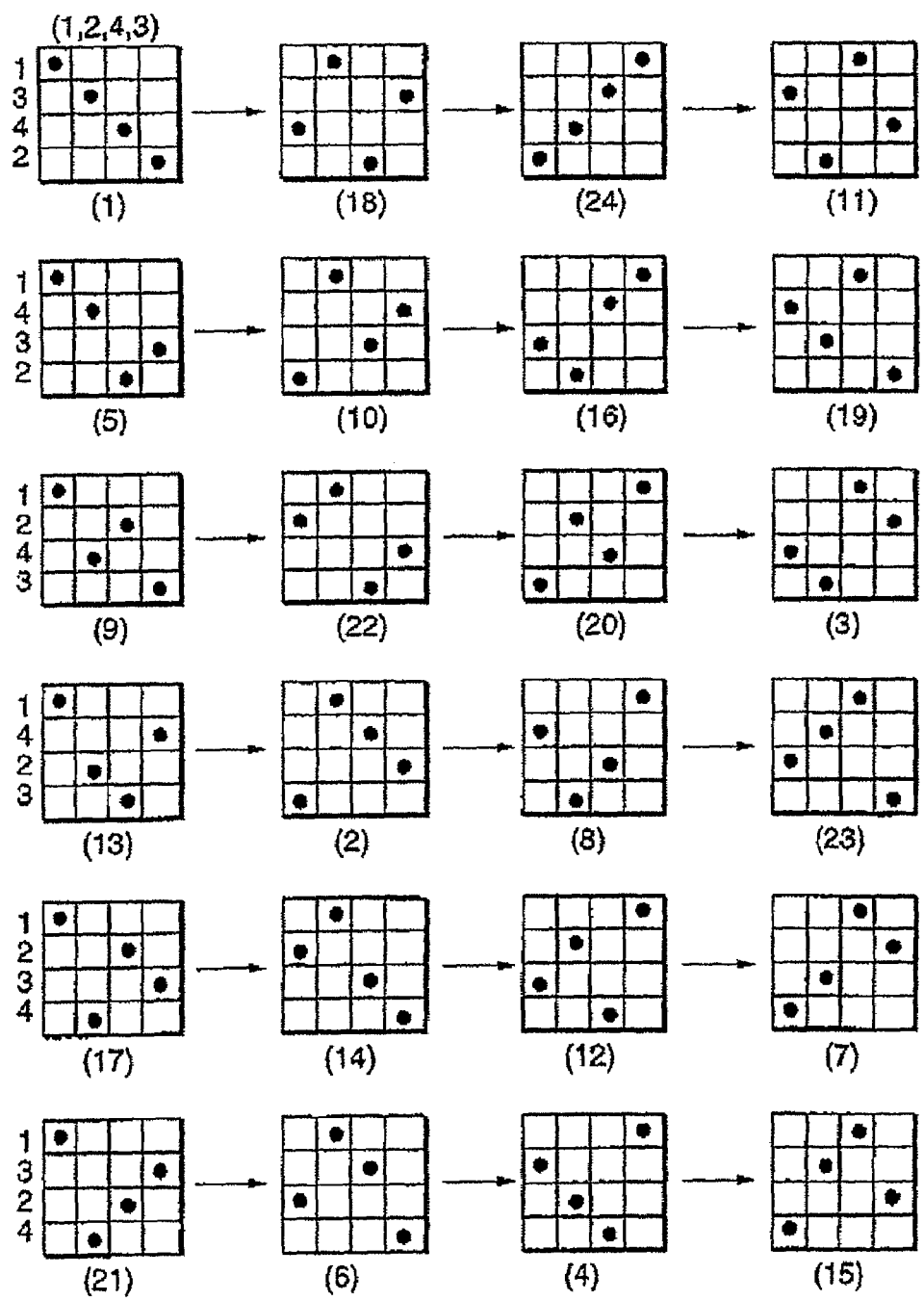
FIG. 10 is a diagram showing a second example of selected sets of diagonal modules and connection sequences of the diagonal modules in the two-dimensional pipelined scheduling performed in the switch scheduler as shown in FIG. 5A.
Figure 11:
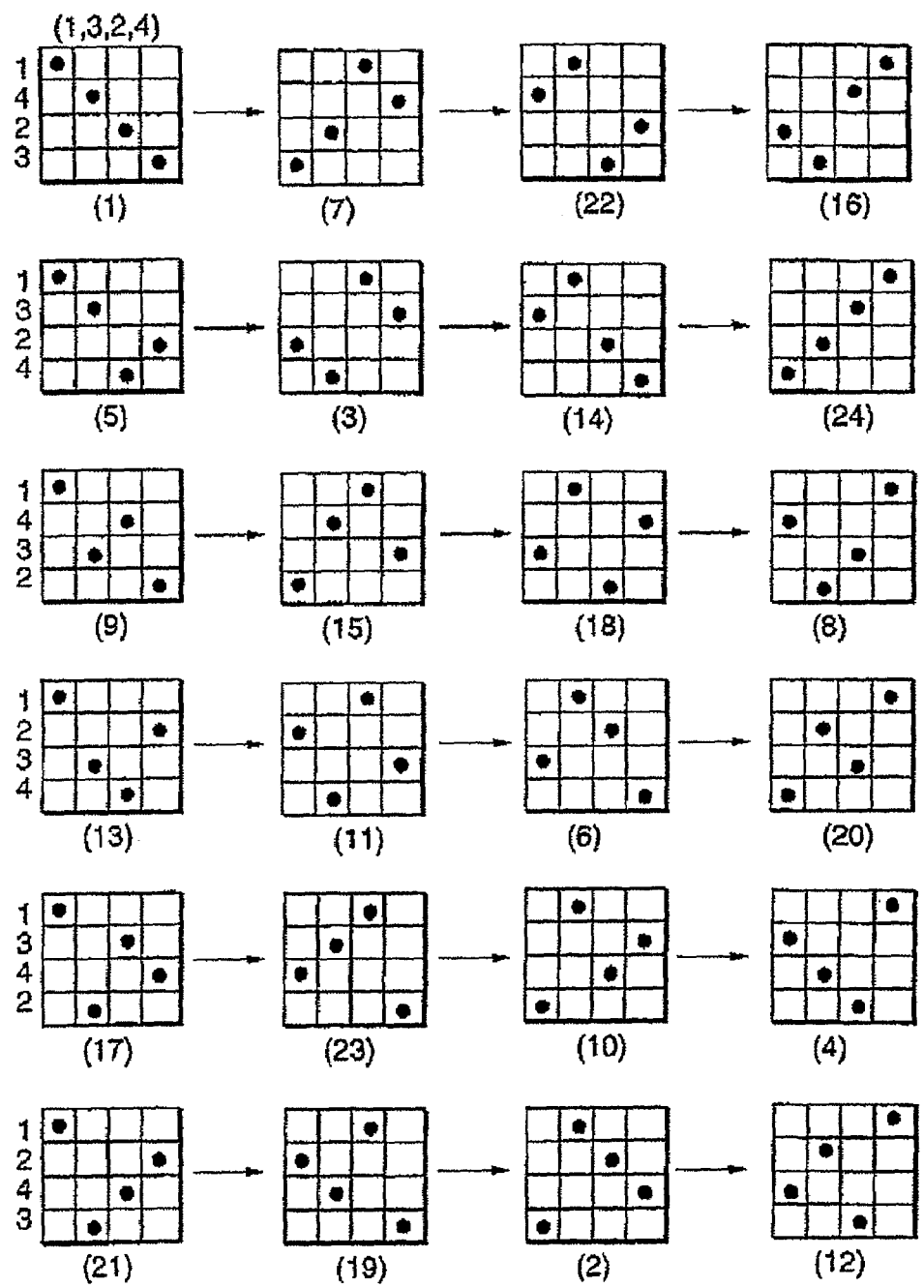
FIG. 11 is a diagram showing a third example of selected sets of diagonal modules and connection sequences of the diagonal modules in the two-dimensional pipelined scheduling performed in the switch scheduler as shown in FIG. 5A.
Figure 12:
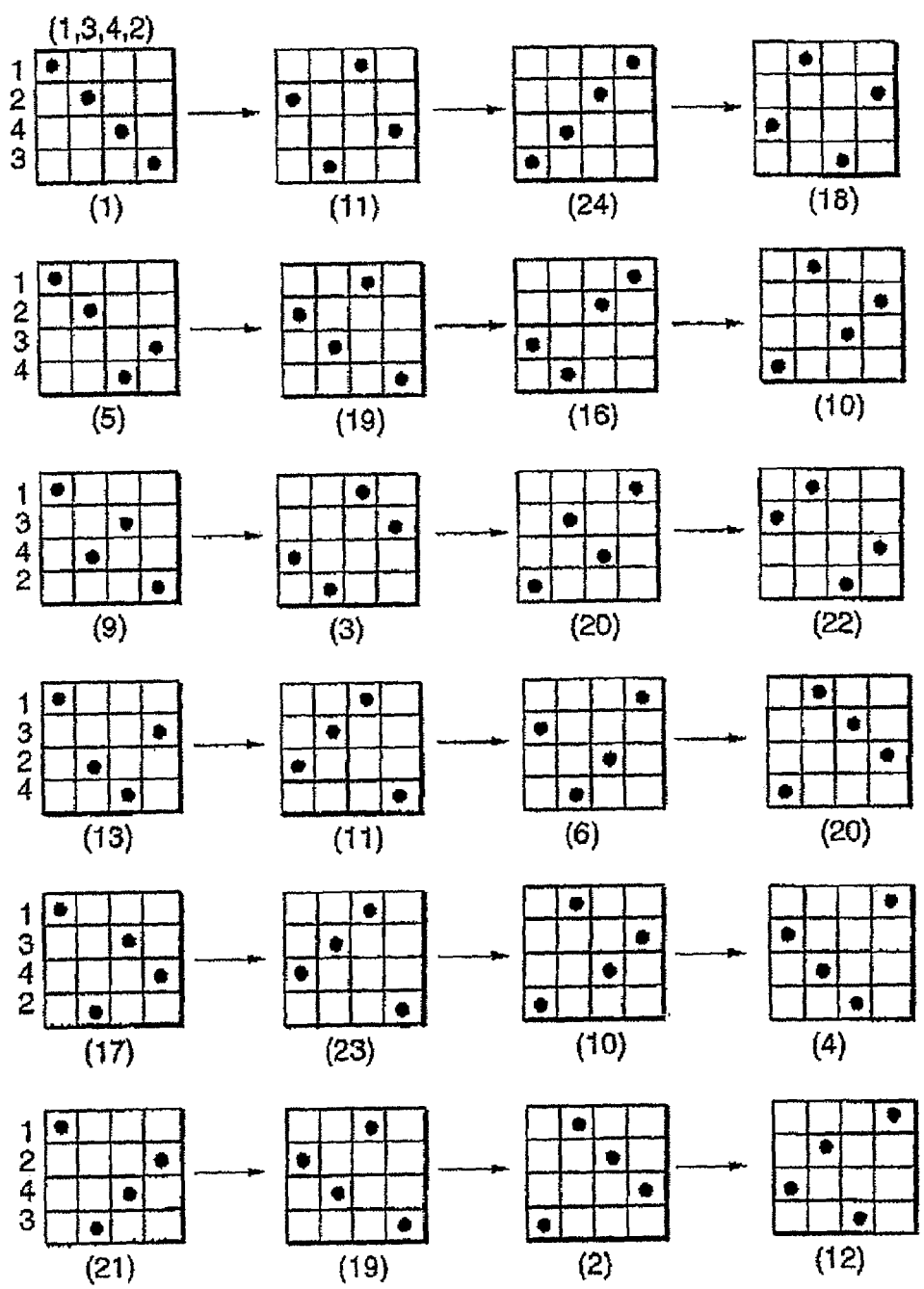
FIG. 12 is a diagram showing a fourth example of selected sets of diagonal modules and connection sequences of the diagonal modules in the two-dimensional pipelined scheduling performed in the switch scheduler as shown in FIG. 5A.
Figure 13:
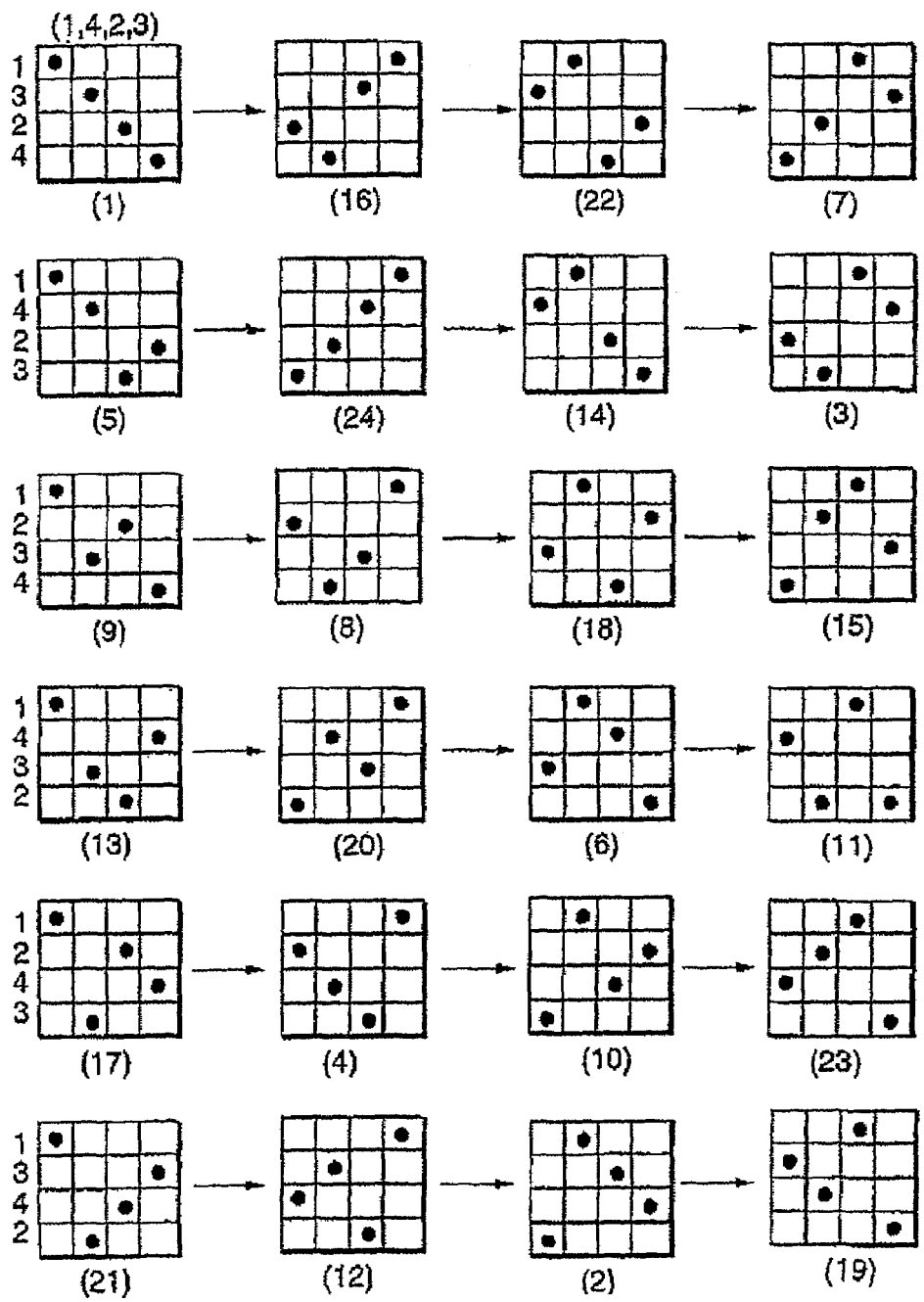
FIG. 13 is a diagram showing a fifth example of selected sets of diagonal modules and connection sequences of the diagonal modules in the two-dimensional pipelined scheduling performed in the switch scheduler as shown in FIG. 5A.
Figure 14:
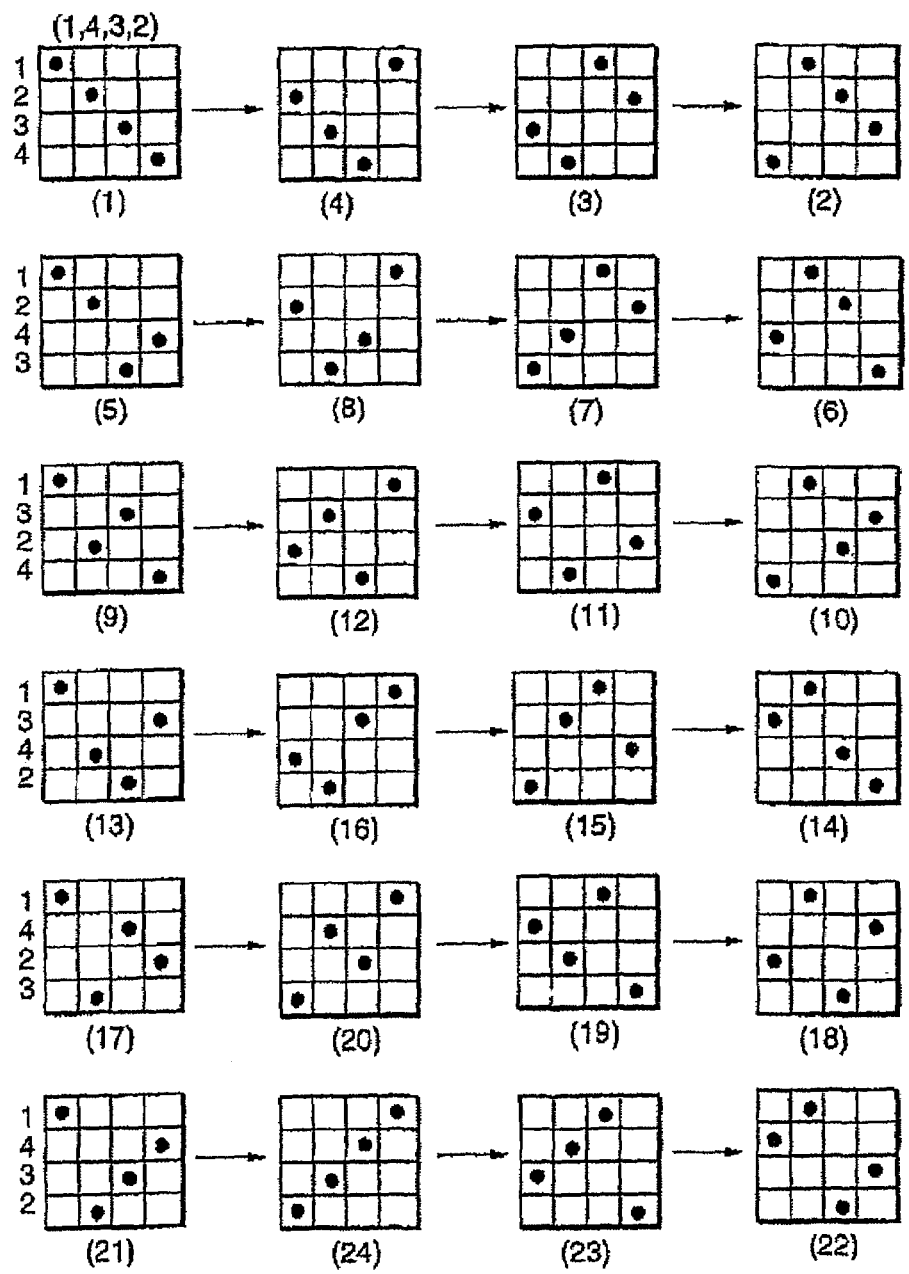
FIG. 14 is a diagram showing a sixth example of selected sets of diagonal modules and connection sequences of the diagonal modules in the two-dimensional pipelined scheduling performed in the switch scheduler as shown in FIG. 5A.

In the present embodiment described with reference to FIGS. 5A, 6, and 7, the four diagonal service patterns indicated by serial numbers (1), (2), (3), and (4) as shown in FIG. 9 are used as a diagonal module group.

More specifically, the scheduling modules $S_1$, $S_6$, $S_{11}$, and $S_{16}$, which provide the first diagonal service pattern (1) perform the scheduling of the scheduling process group 281 at the time slot $T_1$. After having completed the scheduling, the scheduling module $S_1$ numbered 1 transfers the updated reserved input port information 265 to the adjacent scheduling module $S_2$ numbered 2. At the same time, the scheduling module $S_1$ numbered 1 transfers the updated reserved output port information 261 to the adjacent scheduling module $S_{13}$ numbered 4. In the same manner, the reserved input port information 265 and the reserved output port information 261 are sequentially transferred to adjacent scheduling modules as shown by horizontal and vertical arrows in FIG. 5A. Therefore, in the selected diagonal module group, the parenthesized four numerals each separated by a comma are presented in the order as follows: 1, 2, 3, 4, and four numerals vertically arranged on the left side of the matrix are presented from top to bottom in the order as follows: 1, 4, 3, 2.

As described before, such a scheduling module connection sequence is not limited to as shown in FIG. 5A. The scheduling module connection sequence can be determined depending on which one of different diagonal module groups is selected as shown in FIGS. 9-14.

It is apparent that the present invention is not limited to the 4×4 switching system and is also applicable to an arbitrary size of matrix.

The invention claimed is:

1. A method performed by a switching system, the method comprising:
   receiving, by a switch scheduler of the switching system, a first set of packet forwarding requests identifying input port/output port combinations for each of a number of packets;
   identifying, by the switch scheduler, a first diagonal service pattern in a matrix of scheduling modules for scheduling packet forwarding for a first future time slot, where the first diagonal service pattern provides for scheduling of packets designating groups of input port/output port combinations that do not conflict with each other;
   determining, by the switch scheduler, for the groups of input port/output port combinations in the first diagonal service pattern, the input port/output port combinations for which packet forwarding requests are received;
   scheduling, by the switch scheduler, packet forwarding for the determined input port/output port combinations for which packet forwarding requests are received;
   updating, by the switch scheduler, reservation information associated with the groups of input port/output port combinations in the first diagonal service pattern to reflect the scheduling; and transferring, by the switch scheduler, the updated reservation information to scheduling modules in a second diagonal service pattern in the matrix of scheduling modules for scheduling packet forwarding for a second future time slot, where the second diagonal service pattern provides for scheduling of packets designating additional groups of input port/output port combinations that do not conflict with each other, where the matrix of scheduling modules comprises an M×M matrix of scheduling modules for scheduling packet forwarding for a combination of N input ports and N output ports, where M is an integer and N is an integer divisible by M, and where each scheduling module in the matrix of scheduling modules schedules packet forwarding for a group of N/M input ports and N/M output ports.

2. The method of claim 1, where the second diagonal service pattern is different from the first diagonal service pattern.

3. The method of claim 1, further comprising:
receiving prior reservation information for the first future time slot relating to the groups of input port/output port combinations in the first diagonal service pattern; and
scheduling packet forwarding for the groups of input port/output port combinations in the first diagonal service pattern at the first future time slot based on the received packet forwarding requests and the received prior reservation information.

4. The method of claim 3, where the prior reservation information is received from scheduling modules in a third diagonal service pattern.

5. The method of claim 3, where the prior reservation information comprises a logical representation of the input port/output port combinations and where a first logical indication represents a received packet forwarding request for a particular input port/output port combination and a second logical indication represents no receive packet forwarding request for the particular input port/output port combination.

6. The method of claim 5, where the first logical indication comprises a logical "1" and the second logical indication comprises a logical "0".

7. A switching system scheduler, comprising:
a plurality of input ports for receiving packets;
a plurality of output ports for outputting packets; and
a switch scheduler comprising a matrix of scheduling modules, where each of the scheduling modules is configured to schedule packet forwarding connections from a corresponding group of input ports to a corresponding group of output ports based on received packet forwarding requests,
where the switch scheduler is to:
receive a first set of packet forwarding requests identifying input port/output port combinations for each of a number of the received packets,
schedule packet forwarding operations in a first future time slot for groups of input port/output port combinations in a first diagonal service pattern of the matrix, where the first diagonal service pattern designates groups of input port/output port combinations that do not conflict with each other and where the scheduling is based on the received first set of packet forwarding requests,
update reservation information associated with the groups of input port/output port combinations in the first diagonal service pattern to reflect the scheduling, and
transfer the updated reservation information to scheduling modules in a second diagonal service pattern of the matrix, where the second diagonal service pattern provides for scheduling of packets designating additional groups of input port/output port combinations that do not conflict with each other, where the matrix of scheduling modules comprises an M×M matrix of scheduling modules for scheduling packet forwarding for a combination of N input ports and N output ports, where M is an integer and N is an integer divisible by M, and where each scheduling module in the matrix of scheduling modules schedules packet forwarding for a group of N/M input ports and N/M output ports.

8. The scheduler of claim 7, where the second diagonal service pattern is different from the first diagonal service pattern.

9. The scheduler of claim 7, where the switch scheduler is further configured to:
receive prior reservation information for the first future time slot relating to the groups of input port/output port combinations in the first diagonal service pattern, and
schedule packet forwarding operations for the groups of input port/output port combinations in the first diagonal service pattern at the first future time slot based on the received packet forwarding requests and the received prior reservation information.

10. A method performed by a switching system, the method comprising:
receiving, by the switching system, at a matrix of scheduling modules in a switch scheduler of the switching system, a group of packet forwarding requests designating packets to be forwarded, where each of the packet forwarding requests identifies an input port/output port combination associated with a packet to be forwarded;
receiving, at a first group of scheduling modules in a first diagonal service pattern, prior reservation information relating to prior scheduled forwarding operations associated with the scheduling modules in the first diagonal service pattern,
where the first diagonal service pattern provides for scheduling of packets designating groups of input port/output port combinations that do not conflict with each other; and
scheduling, by the switching system, packet forwarding operations for the input port/output port combinations in the first diagonal service pattern based on the prior reservation information and the received packet forwarding requests, where the matrix of scheduling modules comprises an M×M matrix of scheduling modules for scheduling packet forwarding for a combination of N input ports and N output ports, where M is an integer and N is an integer divisible by M, and where each scheduling module in the matrix of scheduling modules schedules packet forwarding for a group of N/M input ports and N/M output ports.

11. The method of claim 10, further comprising:
updating reservation information associated with the groups of input port/output port combinations in the first diagonal service pattern to reflect the scheduling and the prior reservation information; and
transferring the updated reservation information to scheduling modules in a second diagonal service pattern, where the second diagonal service pattern provides for scheduling of packets designating additional groups of input port/output port combinations that do not conflict with each other.

12. The method of claim 11, where the second diagonal service pattern is different from the first diagonal service pattern.

13. The method of claim 11, where the second diagonal service pattern includes scheduling modules adjacent to the scheduling modules in the first diagonal service pattern.

14. The method of claim 10, where the prior reservation information is received from scheduling modules in a third diagonal service pattern.

15. The method of claim 14, where the prior reservation information comprises a logical representation of the input port/output port combinations and where a first logical indication represents a received packet forwarding request for a particular input port/output port combination and a second logical indication represents no receive packet forwarding request for the particular input port/output port combination.

* * * * *